United States Patent
Kleinpeter et al.

(10) Patent No.: US 10,919,186 B2
(45) Date of Patent: Feb. 16, 2021

(54) COLOR-BASED HEATING SYSTEM

(71) Applicant: AIRBUS OPERATIONS GMBH, Hamburg (DE)

(72) Inventors: Roman Kleinpeter, Stade (DE); Tobias Karrasch, Dortmund (DE)

(73) Assignee: Airbus Operations GmbH, Hamburg (DE)

( * ) Notice: Subject to any disclaimer, the term of this patent is extended or adjusted under 35 U.S.C. 154(b) by 208 days.

(21) Appl. No.: 16/145,665

(22) Filed: Sep. 28, 2018

(65) Prior Publication Data

US 2019/0099925 A1   Apr. 4, 2019

(30) Foreign Application Priority Data

Sep. 29, 2017   (DE) .................... 20 2017 105 967.7

(51) Int. Cl.
| | |
|---|---|
| *G01K 11/12* | (2006.01) |
| *B29C 35/02* | (2006.01) |
| *B29C 73/34* | (2006.01) |
| *B64F 5/40* | (2017.01) |
| *B29C 35/04* | (2006.01) |
| *B29C 35/08* | (2006.01) |
| *B29C 37/00* | (2006.01) |

(52) U.S. Cl.
CPC .......... *B29C 35/0288* (2013.01); *B29C 73/34* (2013.01); *B64F 5/40* (2017.01); *G01K 11/12* (2013.01); *B29C 2035/046* (2013.01); *B29C 2035/0822* (2013.01); *B29C 2037/90* (2013.01)

(58) Field of Classification Search
CPC .............................. G01K 11/12; G01N 25/72
USPC ..................................................... 250/338.1
See application file for complete search history.

(56) References Cited

U.S. PATENT DOCUMENTS

| | | | | |
|---|---|---|---|---|
| 3,873,830 A | * | 3/1975 | Forster ................... | G01N 21/88 250/236 |
| 4,854,724 A | * | 8/1989 | Adams ................... | G01N 25/72 374/5 |
| 5,711,603 A | * | 1/1998 | Ringermacher ....... | G01N 25/72 374/5 |
| 5,834,661 A | * | 11/1998 | Nonaka ................... | G01N 25/72 73/866 |

(Continued)

FOREIGN PATENT DOCUMENTS

| | | | | |
|---|---|---|---|---|
| CN | 205531067 U | * | 8/2016 | |
| JP | 07102539 A | * | 4/1995 | |
| JP | 08097548 A | * | 4/1996 | |

OTHER PUBLICATIONS

European Search Report for Application No. 18197244.9 dated Mar. 20, 2019.

*Primary Examiner* — Gail Kaplan Verbitsky
(74) *Attorney, Agent, or Firm* — Jenkins, Wilson, Taylor & Hunt, P.A.

(57) ABSTRACT

A color based heating system is disclosed. A film for repair of aircraft components of fiber reinforced plastic has color changing properties that can include being temperature-dependent. The color changing properties can be reversible. A system for heating a repair site of a component of fiber reinforced plastic includes the film, a camera and a heating plate. The heating plate can have individually controllable heating zones. A controller can use local color signals of the camera for locally controlling local heating zones of the heating plate. The controller can assign local color signals of the camera to temperatures.

5 Claims, 1 Drawing Sheet

(56) References Cited

U.S. PATENT DOCUMENTS

| | | | | |
|---|---|---|---|---|
| 6,079,351 | A * | 6/2000 | Lonno | B29C 70/54 116/206 |
| 7,287,902 | B2 * | 10/2007 | Safai | G01N 25/72 374/121 |
| 7,401,976 | B1 * | 7/2008 | Schlagheck | G01N 25/72 374/5 |
| 7,712,431 | B2 * | 5/2010 | Roche | F16B 43/00 116/207 |
| 8,449,703 | B2 * | 5/2013 | Dan-Jumbo | B64C 1/06 156/94 |
| 9,829,450 | B2 * | 11/2017 | Hucker | G01N 27/20 |
| 9,873,527 | B2 * | 1/2018 | DeGaetano | G01K 11/12 |
| 9,976,968 | B2 * | 5/2018 | Ito | G01L 5/00 |
| 2003/0219059 | A1 * | 11/2003 | Scott | G01N 25/72 374/5 |
| 2006/0274812 | A1 * | 12/2006 | Safai | G01N 25/72 374/5 |
| 2007/0257018 | A1 * | 11/2007 | Huang | H05B 1/0272 219/217 |
| 2011/0132523 | A1 * | 6/2011 | Evens | G01N 33/00 156/94 |
| 2011/0217208 | A1 * | 9/2011 | Narendrnath | G01F 1/28 422/86 |
| 2013/0156067 | A1 * | 6/2013 | Furue | G01K 11/06 374/162 |
| 2014/0000788 | A1 * | 1/2014 | Evens | B29C 73/12 156/94 |
| 2014/0092937 | A1 * | 4/2014 | Azad | G01K 11/12 374/162 |
| 2014/0273240 | A1 * | 9/2014 | Georgeson | G01N 31/229 436/7 |
| 2014/0326389 | A1 | 11/2014 | Blanchard et al. | |
| 2016/0146747 | A1 * | 5/2016 | Degaetano | B29C 73/34 374/162 |
| 2016/0183327 | A1 | 6/2016 | Engel et al. | |
| 2016/0282288 | A1 | 9/2016 | Degaetano et al. | |
| 2017/0204273 | A1 * | 7/2017 | Doherty | C09D 7/61 |
| 2018/0237820 | A1 * | 8/2018 | Martini | C12Q 1/10 |
| 2018/0361595 | A1 * | 12/2018 | Troy | G01B 11/002 |
| 2019/0225543 | A1 * | 7/2019 | Gozum | B29C 73/02 |
| 2019/0300205 | A1 * | 10/2019 | Georgeson | B64F 5/60 |
| 2020/0041420 | A1 * | 2/2020 | Al-Omari | G06T 7/001 |

* cited by examiner

COLOR-BASED HEATING SYSTEM

CROSS-REFERENCE TO RELATED APPLICATION

This application claims priority to German Application No. 20 2017 105 967.7 filed Sep. 29, 2017, the entire disclosure of which is incorporated by reference herein.

TECHNICAL FIELD

The disclosure herein relates to the heating of repair zones in aircraft and aircraft-component construction.

BACKGROUND

Thermoplastic materials are increasingly being used. With this new material there is an associated need for methods of repair and of reworking. Examples include the use of infrared light, ceramic heating, heating blankets or warm-air boxes for adjusting the temperature of heating repair zones. All known heating systems are based on a thermocouple for controlling the heating device. For example, warm-air boxes use a thermocouple to regulate the temperature. A heater warms the air and produces a convection within the box. One object of the disclosure herein was to achieve a better temperature distribution on the component.

SUMMARY

For a person skilled in the art, it has therefore been completely surprising to find that a film with color changing properties is suitable for the repair of aircraft components of fiber-reinforced plastic. It allows the computer- and camera-aided control of heating devices, allowing adjustment of the temperature of the local area of a repair site. It is in this case preferred if the color changing properties are temperature-dependent. It is in this case preferred if the color changing properties are reversible. The disclosure herein also comprises a system for heating a repair site of a component of fiber-reinforced plastic, comprising a film according to the disclosure herein, a camera and a heating plate. It is in this case preferred if the heating plate has individually controllable heating zones. It is in this case preferred if the system has a controller that uses local color signals of the camera for locally controlling the local heating zones of the heating plate.

It is in this case preferred if the controller assigns local color signals of the camera to temperatures. It is in this case preferred if the local control of the local heating zones of the heating plate takes place in such a way that regions of the repair zone lying below the setpoint temperature are heated up more than other regions of the repair zone.

It is in this case preferred if the local control of the local heating zones of the heating plate takes place in such a way that regions of the repair zone lying above the setpoint temperature are heated up less than other regions of the repair zone.

The aspects described above and further aspects, features and advantages of the disclosure herein can likewise be taken from the examples of the embodiments that are described below with reference to the accompanying drawings.

BRIEF DESCRIPTION OF THE DRAWINGS

In the example figures.

DETAILED DESCRIPTION

Figure 1:
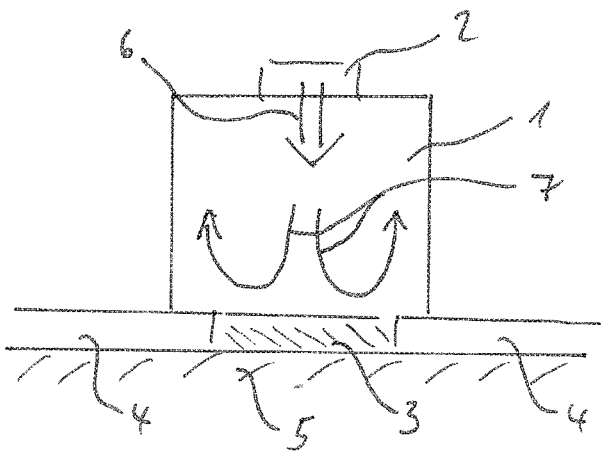
FIG. 1 shows a conventional warming box.

FIG. 1 shows a conventional warming box (1) with a ventilating and heating device (2). The warming box (1) is positioned on a repair site (3) to be heated. The repair site (3) to be heated adjoins intact regions (4). Underneath the regions (3) and (4) there may be an intact region or a tool (5). The ventilating and heating device (2) produces a stream of warm air (6), which finds its way (7) within the warming box (1) and achieves a uniform temperature within the warming box (1) by convection. The control of the heating device (2) is based on a thermocouple, which monitors the temperature at the time. The controller assimilates the signal to a control signal for the heating. The control allows a temperature difference of 5° C. between the actual value and the setpoint value. Sometimes it is not possible to remain within the limits, because there are temporary local warm or cold zones, caused by exothermic reactions or other imponderable reasons.

Figure 2:
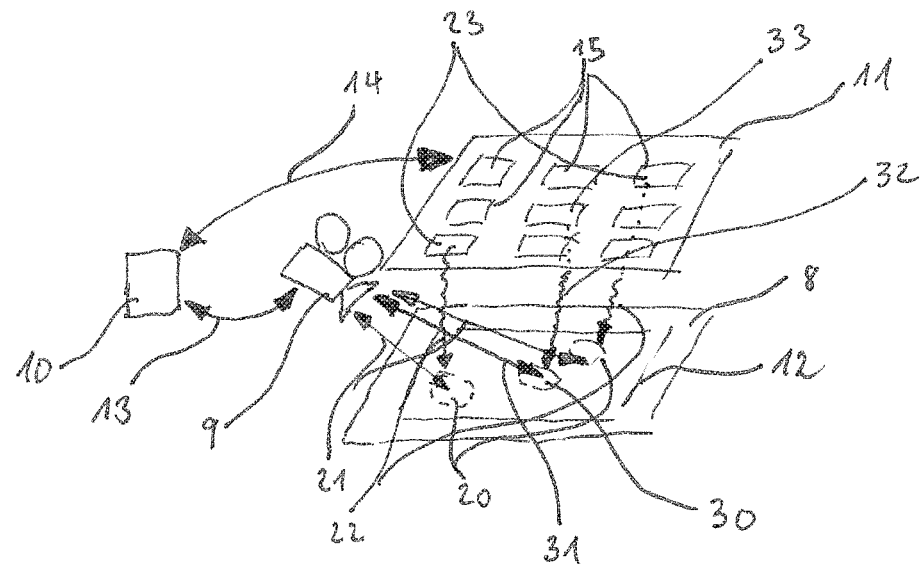
FIG. 2 shows a system according to the disclosure herein.
In the figures, the same reference signs are used for elements, components or aspects that are the same or at least similar. It is noted that there follows a detailed description of embodiments that are merely illustrative and not restrictive.

FIG. 2 shows a system according to the disclosure herein.
The system according to the disclosure herein comprises a color changing film (8), a camera, a controller (10), for example a computer or processor, and a heating plate (11). The color changing film (8) changes its color according to the temperature. Two types of film can be used: a) The color changes according to the temperature continuously through a given color spectrum. b) There are two "color steps"; for example, if the temperature lies within a certain range, the film is green. If the temperature is too high, the film becomes red and, if the temperature is too low, the film becomes blue. The camera (9) monitors the repair zone (12), in particular the color of the film, and sends a live stream (13) to the controller/computer (10). The computer (10) assigns a temperature to the colors in the image that are received by the camera (9) and generates a signal (14) for the heating plate (11). The heating plate is locally controllable and has various heating zones (15). According to the control signal (14) that is received by the controller (10) it heats up the repair zone (12) locally.

For example, by optical inspection (21) of its local color, a region of the repair site (20) that lies above the setpoint temperature can be irradiated with less energy (22) by appropriate control of the corresponding heating zone (23), while, by optical inspection (31) of its local color, a region of the repair site (30) that lies below the setpoint temperature can be irradiated with more energy (32) by appropriate control of the corresponding heating zone (33), in order to achieve a uniform adjustment of the temperature of the repair site (12). The result is a heating system for repair zones that can be controlled locally on the basis of the temperature at the time. The film (8) can also be used as a vacuum film and can replace the conventional vacuum film.

While the disclosure herein has been illustrated and described in detail in the drawings and the preceding description, it is intended that such illustrations and descriptions are merely illustrative or exemplary and not restrictive, so that the disclosure herein is not restricted by the embodiments disclosed. In the claims, the word "comprising" does not exclude other elements and the indefinite article "a" or "an" does not exclude more than one.

The fact alone that certain features are mentioned in various dependent claims does not restrict the subject matter of the disclosure herein. Combinations of these features can also be advantageously used. The reference signs in the claims are not intended to restrict the scope of the claims.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Warming box
2 Ventilating and heating device
3 Repair site to be heated
4 intact regions
5 intact region or tool
6 Stream of warm air
7 Convective distribution of the warm air
8 Color changing film
9 Camera
10 Controller/computer
11 Heating plate
12 Repair zone
13 Live stream
14 Control signal
20 Region of the repair site that is too warm
21 Optical inspection
22 Energy flow
23 Heating zone
30 Region of the repair site that is too cool
31 Optical inspection
32 Energy flow
33 Heating zone

The invention claimed is:

1. A system for heating a repair site of a component of fiber reinforced plastic, the system comprising:
a film having color changing properties that are temperature-dependent;
a camera;
a heating plate having individually controllable heating zones, the heating plate being configured for arrangement on an opposite side of the repair site of the component from the film; and
a controller configured to use local color signals of the camera for locally controlling the individually controllable heating zones of the heating plate, such that any regions of the repair site, which correspond to one or more of the individually controllable heating zones and in which a temperature thereof is below a setpoint temperature, have more heat applied thereto to achieve the setpoint temperature over all regions of the repair site.

2. The system according to claim 1, wherein the film is a vacuum film.

3. The system according to claim 1, wherein the color changing properties of the film are reversible.

4. The system according to claim 1, wherein the controller is configured to assign local color signals of the camera to temperatures.

5. The system according to claim 1, wherein the controller is configured such that any regions of the repair site lying above the setpoint temperature are heated up less than other regions of the repair zone to achieve a uniform temperature over the repair site.

* * * * *